United States Patent [11] 3,607,307

[72] Inventor Harry A. Peyser
 Olympia Fields, Ill.
[21] Appl. No. 831,811
[22] Filed May 9, 1969
[45] Patented Sept. 21, 1971
[73] Assignee Continental Can Company, Inc.
 New York, N.Y.

[54] PROCESS FOR PREPARING A FROZEN CONFECTION FROM A CARBONATED BEVERAGE
 3 Claims, No Drawings

[52] U.S. Cl.......................................................... 99/136,
 99/189
[51] Int. Cl......................................................... A23g 5/00,
 B65b 31/00
[50] Field of Search........................................... 99/171, 171
 B, 136, 137, 31, 49, 79, 189, 197

[56] References Cited
UNITED STATES PATENTS

| | | | |
|---|---|---|---|
| 2,343,767 | 3/1944 | Getz | 99/136 |
| 3,460,713 | 8/1969 | Cornelius | 99/79 |
| 3,505,075 | 4/1970 | Black | 99/136 |
| 3,515,560 | 6/1970 | Bayne | 99/28 |

Primary Examiner—Frank W. Lutter
Assistant Examiner—Steven L. Weinstein
Attorneys—Paul Shapiro, Joseph E. Kerwin and William A. Dittmann ABSTRACT: A packaged carbonated beverage which can be frozen to a flavored solid crystalline confection having a snowlike physical appearance, comprising a flavored carbonated beverage packaged in a suitable container having incorporated therein a fluorinated hydrocarbon.

PROCESS FOR PREPARING A FROZEN CONFECTION FROM A CARBONATED BEVERAGE

BACKGROUND OF THE INVENTION

1. Field of the Invention

This invention relates to a frozen confection suitable for dessert or between-meal consumption. More particularly, it relates to a packaged flavored carbonated beverage which can be frozen to form a solid, edible food product having a snowlike appearance and texture.

2. The Prior Art

Flavored carbonated beverages, otherwise known as carbonated, nonalcoholic beverages, soft drinks, soda pop, tonic, and the like, are currently packaged and distributed in glass bottles or metal cans.

These carbonated beverages are customarily prepared by preparing a syrup from a blend of water, sugar or artificial sweetener, beverage acid, coloring, and flavoring. A measured amount of the blended syrup mixture is transferred to a can or other container which is then charged with purified carbonated water and sealed.

Among the consuming public, there is at the present time a demand for a frozen flavored food dessert which can be conveniently prepared by freezing in the freezer compartment of a home refrigerator, carbonated beverages presently packaged and sold in metal containers. Attempts have been made in the past on the part of carbonated beverage packagers to produce a flavored carbonated beverage which can alternately be chilled for drinking purposes or frozen to produce a solid food product having a snowlike consistency, similar to ices, which can be eaten. These attempts have generally not produced an acceptable product, as the freezing of the flavored carbonated beverage generally causes the syrup and gas contained therein to separate and form a frozen product of poor visual appearance and taste.

SUMMARY OF THE INVENTION

In accordance with the present invention, there is provided a packaged flavored carbonated beverage which, when subjected to freezing conditions, forms a flavored, solid, snowlike confection product without separation of flavoring agent and carbonating agent during storage which is comprised of a conventional flavored carbonated beverage formulation having incorporated therein a relatively small amount of a fluorinated hydrocarbon.

PREFERRED EMBODIMENTS

In preparing conventional soft drinks, the syrup is usually prepared by a manufacturer and shipped to various bottlers where carbonated water is added to the container. The beverage syrup or condensate contains sweeteners as well as beverage acids, flavorings and colorings. The sweetener in the syrup can be either an artificial sweetener, sugars, or mixtures thereof.

In soft drinks of the ordinary type, the sweetener, sugar, i.e., invert sugar or dextrose, comprises about 11 percent to 13 percent concentration by weight of the diluted drink. In dietetic beverages of the low-calorie type, an artificial sweetener such as sodium or calcium cyclamate or saccharin comprises about 0.05 percent to 0.40 percent by weight of the diluted drink.

Typical "beverage flavoring" ingredients incorporated in the syrup include: caffein for cola-type drinks, ginger and citrus oils for ginger ale, artificial fruit flavoring with or without a fruit extract for imitation fruit drinks, vanilla, vanillin or bourbonal for cream-soda, oil of wintergreen, oil or sweet birch, or methyl salicylate for root beer.

One of the commonly used beverage acids is citric acid. Citric acid adapts itself well to nearly all light or fruity flavors. Phosphoric acid is widely used in cola drinks, and the heavier leaf, root, nut or herbal flavors, while tartaric acid is used in grape flavors. In lesser amounts, adipic, fumaric, succinic, and lactic acids are also used. Malic acid is used for apple flavors.

With fruit-flavored carbonated beverages, a preservative such as benzoate of soda is often added.

Typical "beverage coloring materials" include artificial colors such as carmel color, or a water-soluble U.S. certified coal tar color.

Fluorinated hydrocarbons which may be incorporated in conventional carbonated beverages to prepare the confection product of the present invention include nontoxic, partially fluorinated or partially chlorofluorinated, or totally fluorinated hydrocarbons preferably having vapor pressures within the range of about 5 to about 30 pounds per square inch gauge at 70° F. In addition, a mixture of two or more such compounds which, although the individual ingredients may have vapor pressures outside the desired range, have, when combined, a vapor pressure within that range which may be employed.

Suitable fluorinated hydrocarbons include 1,2-dichlor-1,1,2,2-tetrafluorethane, trichlorotrifluoroethane chloropentafluorethane, dichlorodifluoromethane, 1,1-difluorethane, and 1-monochlor-1,1-difluorethane, octafluorocyclobutane, and mixtures thereof.

The fluorinated hydrocarbon used in the practice of the present invention is conveniently introduced into a conventional carbonated beverage formulation at any convenient stage in the manufacturing process prior to packaging and most preferably, immediately prior to final packaging.

In accordance with the practice of the present invention, the fluorinated hydrocarbon is introduced in metered amounts into the carbonated beverage container under a pressure above its vapor pressure at the prevailing temperature during packaging so that the fluorinated hydrocarbon is conveniently in the liquid phase. The fluorinated hydrocarbon is mixed with the carbonated beverage in the container by agitation induced by shaking or by the introduction of the ingredients or by any other means known to the art.

Suitable amounts of the fluorinated hydrocarbon which may be incorporated in the conventional soft drink formulations in accordance with the practice of the present invention are in the range of about 0.05 percent to about 1.0 percent by weight of the finished drink, while about 0.1 percent to about 0.5 percent of the drink is preferred.

To prepare a frozen confection from the fluorohydrocarbon modified, flavored carbonated beverage, the temperature of the packaged beverage having the fluorinated hydrocarbon incorporated therein is lowered below the freezing point of the beverage, i.e., a temperature generally in the range of 0° to 15° F. At these temperatures, the beverage forms into a colored, flavored, finely divided crystalline solid, substance, resembling snow in physical appearance and texture.

As an example of the invention, individual 6–ounce beverage cans were filled with an orange-flavored carbonated beverage. About 0.5 grams of dichlorodifluoromethane (Freon 12) at a temperature of 75° F. was added through an aerosol valve by means of an aerosol pressure filling apparatus to the individual 6–ounce soft drink cans after the cans were closed. The cans were then chilled to 10° F. for 96 hours to observe the effect of the dichlorodifluoromethane on the formation of a frozen, solid product.

After the freezing cycle was completed, the can was opened and a solid product was removed from the can. Examination of the frozen product indicated that a uniform solid product having the physical appearance and texture of snow had been formed. Very little separation of carbon dioxide, syrup and coloring in the product was observed. The resulting frozen dessert had good color, uniform texture, and resembled orange ices in taste.

By way of contrast, when the same carbonated beverage without the addition of dichlorodifluoromethane was frozen, separation of the syrup and carbon dioxide resulted, and part of the product solidified to the form of an ice cube. The separated syrup migrated to one end of the can, as did the carbon dioxide. A violent expulsion of liquid product and gas occurred when the can was opened to examine the frozen product.

It is to be understood that the preceding example is representative, and that the example may be varied within the scope of the total specification, as understood by those skilled in the art, to produce essentially the same results.

As many apparently widely different embodiments of this invention may be made without departing from the spirit and scope thereof, it is to be understood that this invention is not limited to the specific embodiments described herein, except as defined in the appended claims.

What is claimed is:

1. A process for preparing a solid confection resembling snow in appearance and texture comprising providing a sealed container containing an unfrozen quantity of an aqueous, nonalcoholic carbonated beverage containing a flavoring agent, a coloring agent and a carbonating agent, incorporating in the beverage in said container an amount of fluorinated hydrocarbon under a pressure above its vapor pressure at the prevailing temperature sufficient to prevent the separation in the frozen state of the carbonating agent and the flavoring agent and then chilling the beverage in said container to a temperature below the freezing point of the beverage to prepare the solid confection.

2. The process of claim 1 wherein the fluorinated hydrocarbon is incorporated in the beverage in an amount ranging from about 0.05 percent to about 1.0 percent by weight.

3. The process of claim 1 wherein the fluorinated hydrocarbon is dichlorodifluoromethane.